March 30, 1954  G. T. RANDOL  2,673,555
MECHANICAL SELF-ADJUSTING VALVE LIFTER
Filed Feb. 23, 1951
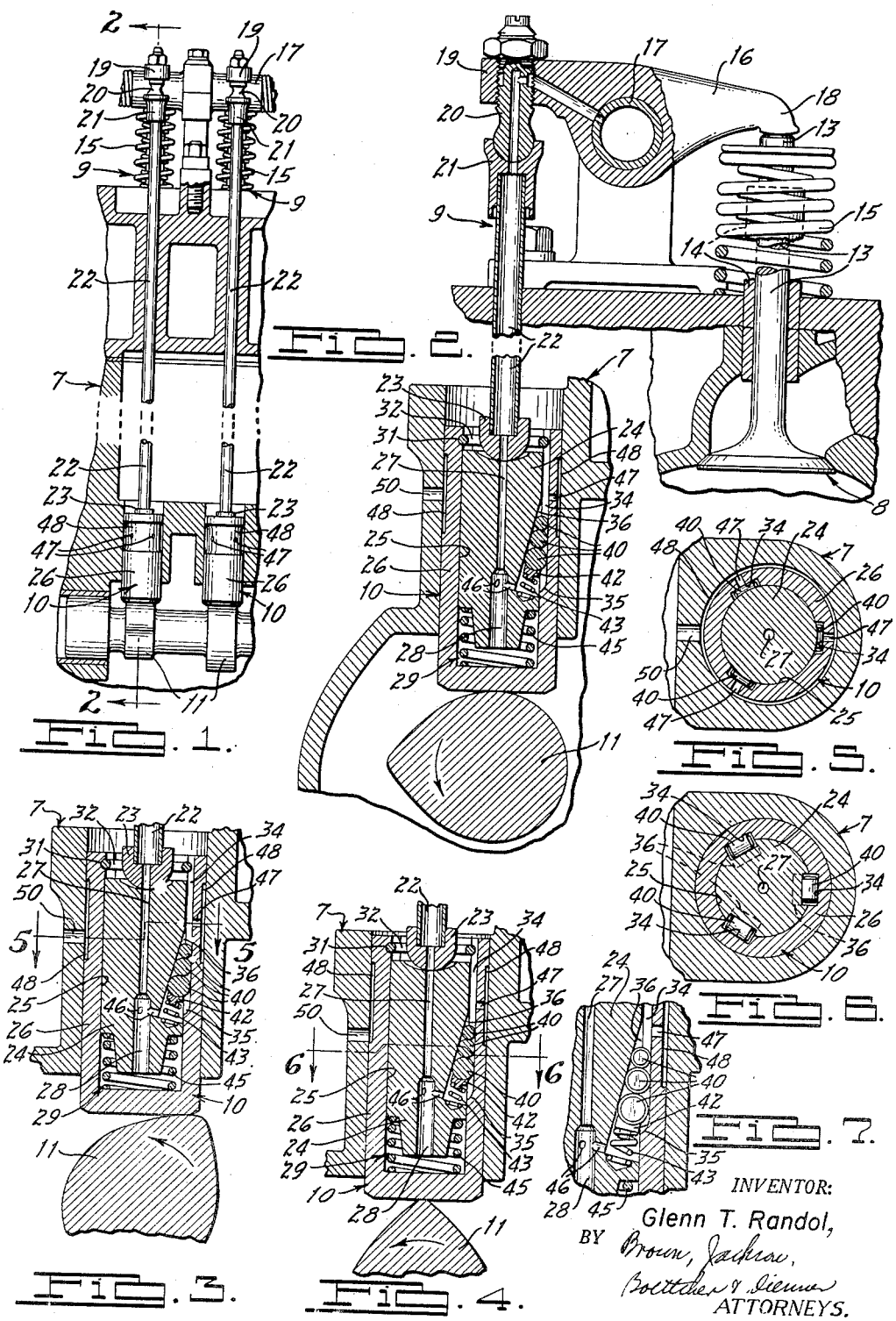
INVENTOR:
Glenn T. Randol,
BY Brown, Jackson,
Boettcher & Dienner
ATTORNEYS.

Patented Mar. 30, 1954

2,673,555

UNITED STATES PATENT OFFICE 2,673,555

MECHANICAL SELF-ADJUSTING VALVE LIFTER

Glenn T. Randol, Mountain Lake Park, Md.

Application February 23, 1951, Serial No. 212,379

7 Claims. (Cl. 123—90)

My invention relates to an improvement in a mechanical self-adjusting valve lifter which is adapted to maintain substantially infinite zero clearance in the valve drive train of an engine in which it is embodied.

The invention of my present application is related to that of my earlier co-pending application, Serial No. 198,215 filed November 29, 1950, now matured as Patent 2,672,132, dated March 16, 1954, to which reference may be had.

In my earlier application, above referred to, I have provided a valve lifter mechanism adapted to be arranged in the valve drive train, between an engine valve and cam shaft, comprising an outer body member or element mounted for sliding movement in the block of an engine, an inner body member or element mounted for sliding movement in and relative to the outer body member or element to establish substantially zero clearance in the valve drive train, and clutch means between the inner and outer body members or elements effective, upon engagement thereof, to lock the body members together in adjusted position for opening of the engine valve. In the particular embodiment of my invention disclosed in the application above identified, the clutch means between the inner and outer body members comprises clutch elements or shoes provided with positive clutch elements in the shape of teeth, which are adapted to have engagement with conformably shaped clutch teeth formed in the outer body member, so that the clutch, when engaged, locks the inner and outer body members together for conjoint movement to control the engine valve.

The above referred to structure is well suited to compensate for maintaining substantially zero clearance in the valve drive train and effecting, as disclosed in that application, the elimination substantially of backlash in the valve operating mechanism. In the structure noted, however, adjustments in the valve drive train to maintain substantially zero clearance is limited in actual valve actuation to the distance between the horizontal bases of adjacent grooves of substantially inverted saw-tooth formation in cross section defining the positive clutch elements of the clutch means for clutching the inner and outer body members together.

It is an object of my present invention to provide a valve lifter mechanism embodying relatively movable outer and inner body members or elements, and clutch means operably incorporated between the body members of a character for maintaining the infinite degree of adjustment between the outer and inner body members during valve actuation, thus providing for truly maintaining substantially zero clearance in the valve drive train in which the valve lifter is embodied.

In order to achieve the above object, I propose to provide clutch means normally operable to engaged position, upon relative movement in one direction of the outer and inner body members with respect to each other. This may be accomplished, for example, by the provision of suitable one-way clutch means which, in the specific embodiment of my invention herein disclosed, is defined by a plurality of rollers disposed in suitable tapered groove means between the inner and outer body members. The rollers engage in such groove means upon relative movement of the body members in one direction, with respect to each other, upon actuation of the mechanism by an engine cam, so that the body members are clutched together by binding or wedging of the rollers therebetween, and the rollers are disengaged upon relative movement in the other direction of the body members with respect to each other and remain disengaged until the mechanism is again actuated in said one direction by the engine cam. In such an arrangement of parts, the clutch means is caused to be engaged upon opening of the valve and is caused to be disengaged upon closing of the engine valve.

A further preferred feature of my invention resides in providing suitable biasing means, such as a spring, between the outer and inner body parts or elements for normally biasing them in a direction to disengage the clutch means therebetween and for accommodating relative movement of the body parts in the other direction when the clutch means is disengaged, and which biasing means is operable to establish substantially zero clearance in the valve drive train, with the engine valve closed, and further serving to take up any backlash in the valve drive train.

A still further object of my invention resides in providing an oil chamber between the outer and inner body members, which, by way of example, may have connection with the oil pressure supply of the vehicle engine, to supplement by way of a dash-pot action the engaging actuation of the clutch means in maintaining substantially zero clearance in the valve operating train, and effecting unison movement of the inner and outer body parts in opening and closing of the engine valve.

The above and other objects and advantages of my invention will appear from the detail description.

Now, in order to acquaint those skilled in the art with the manner of making and using valve lifter mechanisms in accordance with the principles of my present invention, I shall describe, in connection with the accompanying drawings, a preferred embodiment of my invention.

In the drawings:

Figure 1 is a fragmentary vertical sectional view through an internal combustion engine, showing in elevation a valve lifter mechanism constructed in accordance with the principles of my present invention;

Figure 2 is an enlarged vertical sectional view taken substantially along the line 2—2 of Figure 1, looking in the direction indicated by the arrows, and showing my valve lifter mechanism in engine valve closed position;

Figure 3 is a detail vertical sectional view of the valve lifter mechanism of Figures 1 and 2, with the parts thereof in locked-up zero clearance condition just prior to opening of the engine valve;

Figure 4 is another detail vertical sectional view of the valve lifter mechanism of Figures 1 and 2, but showing the parts thereof in engine valve open position;

Figure 5 is a transverse sectional view taken substantially along the line 5—5 of Figure 3, looking in the direction indicated by the arrows;

Figure 6 is a transverse sectional view taken substantially along the line 6—6 of Figure 4, looking in the direction indicated by the arrows; and Figure 7 is an enlarged partial sectional view illustrating the clutch means of the valve lifter mechanism of my present invention.

Referring now to the drawings, I have shown a preferred embodiment of my invention incorporated with a conventional internal-combustion engine 7 having a plurality of valves, one of which is shown at 8 in Figure 2. A valve drive train, indicated generally at 9, is provided, as is well understood in the art, for each valve of the engine, and the valve drive train is conventional in all respects except for the valve lifter mechanism 10 of my invention, which is embodied therein. The valve drive train 9, as shown, extends between the valve 8 and the cam shaft 11 of the engine. The valve 8 may be of any known construction, and the valve selected for illustration includes a stem portion 13, guided in a collar part 14, and having spring means 15 associated therewith for normally tending to close the valve. A rocker arm 16, pivotally mounted intermediate its ends on an oil distributing pipe 17, is adapted to bear at one end 18 thereof against the free end of stem 13 when rotated in a clockwise direction, as viewed in Figure 2 of the drawings, to open valve 8 against the force of the spring means 15. The other end 19 of the rocker arm 16 has a fitting 20 secured therein, and with which is associated a connector member 21 having one end of a hollow push rod 22 secured thereto. The other end of the push rod 22 has a connector 23 secured thereto, which bears against the dished upper end portion of an inner body member 24, which is mounted, in the embodiment of my invention herein disclosed, for vertical sliding movement in a bore 25 of an outer body part 26. The inner body part 24 and the outer body part 26, as will presently appear, form a part of the lifter mechanism 10 of my present invention. The end portion 19 of the rocker arm 16, fitting 20, connector 21 and member 23 are provided with suitable bores and, together with the hollow rod 22, conduct oil under pressure from the pipe 17 of the lubricating system of the engine to a bore 27, formed centrally of the inner body part 24, and a counterbore 28 forming an extension of the bore 27 to a chamber, indicated generally at 29, defined by lower end of the bore 25 in the outer part 26 and the inner end portion of the inner body part 24. The function and purpose of the charged chamber 29 will be referred to in greater detail hereinafter.

It will be observed that the lifter mechanism 10 of my present invention thus comprises an inner body part 24, which is mounted for rectilinear sliding movement in the bore 25 of the outer body part 26. The outer body part 26, adjacent the upper end thereof, is formed with an annular groove 31 for receiving a snap ring 32 which serves, when the valve lifter mechanism is disassembled from the engine, for retaining the inner and outer body parts in assembled relation when the valve lifter mechanism 10 is removed from the block of the engine.

Referring now particularly to Figures 2, 5, and 6, it will be observed that the bore 25 of the outer body member 26, at the upper portion thereof, is formed with a plurality of circumferentially spaced vertically extending grooves or races 34 having inner end walls 35 which merge into the bore 25. The inner body member 24 is also formed with a plurality of circumferentially spaced grooves or ramps, indicated at 36, which extend generally diagonally downwardly and inwardly of the inner body member and in register with the aforementioned grooves or races 34 of the outer body part 26. In the specific embodiment of my invention herein shown, the outer body part 26 is provided with three grooves or races 34 and the inner body part 24 is provided with three grooves or ramps 36, in register with the grooves 34. The grooves 34 and 36 are provided with flat bottom surfaces and have interposed therebetween a plurality or series of roller clutch elements 40 of graduated increasing diameters from the top to the bottom of the groove means, defined by the opposed grooves 34 and 36 of the outer and inner body parts, respectively. The roller clutch elements 40 are preferably cylindrical rollers, as is shown in Figure 6, but may suitably comprise balls or other roller elements. The lowermost roller clutch element 40 fits upon a shoe 42 which is supported on a spring 43 disposed between the shoe and the end of the groove 36 in the inner body part, with the spring being effective to bias normally the series of rollers 40 into engagement with the bottom surfaces of the grooves 34 and 36 of the outer and inner body parts, respectively. The springs, for each of the series of roller clutch elements 40, normally tend to bias the latter in the direction of clutching engagement with the bottom surfaces of the grooves 34 and 36 to maintain normally the rollers in engagement with the bottoms of the grooves 34 and 36, or in rolling engagement with the races 34 and ramps 36, but are adapted to accommodate movement of the rollers 40 in the opposite direction when the body members 24 and 26 adjust relatively to one another. It will be observed that the inner end portion of the inner body member 24 is frusto-conical configuration, and a coil spring 45 is disposed between the end wall at the inner end of the bore 25 of the outer body part 26 and the shoulder formed by the frusto-conical portion of the inner body member. The spring 45 normally tends to bias the inner and outer body parts away from each other but is capable of accommodating movement of the body parts toward each other.

It will be observed that the inner body part 24 is further provided with a generally transversely extending drill hole or bore 46 at each groove 36, connecting the counterbore 28 with the lower end portion of the groove 36 of the inner body part so that oil under pressure from the lubricating system may enter the groove means defined by the grooves 34 and 36 of the outer and inner body parts, respectively. The bores 46 are of such diameter to meter or limit the amount of oil passing therethrough, so as to maintain oil under pressure in chamber 29. The outer body part, above the rollers 40, at grooves 34, is further provided with a plurality of radially extending drill holes or bores 47, which communicate with an outer annular vertically extending groove 48 at the upper portion of the outer body part, which, in turn, has communication with a bore 50 formed in the engine valve block 7 so that oil under pressure from the oil distributing pipe 17 may flow through the passageway defined by the bore 46, the groove means defined by the grooves 34 and 36 of the outer and inner body parts, respectively, the bores 47, the annular recess 48, and the bore 50 for return to the engine sump.

I shall now describe the manner in which the valve lifter mechanism 10 of my present invention operates, and for this purpose reference may be had to Figure 2, in which the engine valve is shown in closed position. In the position of the parts in the figure noted, the spring 45 between the inner and outer body parts biases the flat bottom end of the outer body part into engagement with the circle portion of the cam 11 and normally biases the inner and outer body parts away from each other but is capable of accommodating relative movement in either direction between the body parts to establish zero clearance in the valve drive train. The several rollers 40 are in engagement with the bottom surfaces of the grooves 34 and 36, with the springs 43, at the lower ends of each of the groove means, defined by the grooves 34 and 36, maintaining physical contact of the rollers with the surfaces mentioned.

Now, as the cam shaft rotates in a counterclockwise direction, as indicated by the arrow, to the position shown in Figure 3, the outer body part 26 is acted upon by the cam forcing it upwardly, and such upward thrust of the outer body member, in turn, acts on the several rollers 40 to roll them up the ramps 36 and into binding or wedging engagement with the bottom surfaces of the grooves 34 and 36 of the inner and outer body members, respectively. The clutch means, thus defined by the rollers 40 and the aforementioned groove means, clutches the outer and inner body parts together during the initial stages of actuation of the outer body part by the cam 11 so that additional upward movement of the outer body member 26, as by advancement of the cam to the position shown in Figure 4 of the drawings, effects the conjoint movement of the outer and inner body parts together, and actuation of the valve drive train to open the valve 8 of the engine. Upon further rotation of the cam 11 in a counterclockwise direction from the position shown in Figure 4 to the position shown in Figure 2, the outer body member 26 will assume a relatively relaxed condition and will commence a downward movement with respect to the inner body member to free the clutch means. At this time, the body members will be free to move in either direction with respect to one another to compensate for expansion or contraction of the valve drive train. Expansion in the valve drive train, such as that occurring as the engine warms up, is compensated for by relative movement of the body members toward one another to shorten the valve drive train and avoid over-adjustment thereof. This compensating movement is readily accommodated by the spring 45 and the fluid in the chamber 29 while the outer body member is in its relaxed condition and the clutch means is free, that is, when the outer body member is not under the forcible urge of the cam 11. Contraction of the valve drive train is compensated for as the spring 45 biases the outer and inner body members apart, serving to take up any backlash in the valve drive train and to establish zero clearance in the valve drive train. When the outer body member is relaxed, or freed from the lobe portion of the cam 11, and adjustment is required in the valve drive train, the clutch elements will retract slightly from their wedging position so that relative movement of the body members in either direction will be accommodated. During relative movement of the body members, the roller clutch elements will most likely remain stationary, although a slight amount of rolling may occur during initial release of the same from wedging position, and will slide bodily with respect to the vertical wall of the races 34 provided in the outer body member to accommodate the adjustment of the valve drive train. However, when a relatively rapid upward thrust is imparted to the body member 24 by the cam 11, the rollers 40 will be rolled up the ramps 36 due to their engagement in the races 34, to lock the body members together for conjoint movement. As will be appreciated from the foregoing, the valve lifter mechanism of the present invention is adapted to effect such minute adjustment as may be required to maintain substantially a zero-lash condition in the valve drive train, and the clutch means are adapted to lock the mechanism in adjusted relation to maintain the valve drive train in such zero-lash condition during opening and closing of the engine valve. While the grooves 34 in the outer body part extend substantially vertically, the incline of the grooves 36 in the inner body part define substantially a V-shaped groove to achieve the locking of the body parts in minutely adjusted relation.

It will be further observed that in the operation of the valve lifter mechanism 10 of my invention, the chamber 29, between the inner end of the inner body part 24 and the closed lower end of the outer body part 26, is constantly filled with oil of limited pressure due to its connection with the pressure lubricating system of the engine, as previously described. The oil thus delivered to the bore 27 and the counterbore 28 of the inner body part 24 can constantly pass through the bores 46, communicating with the lower ends of the grooves 36 of the inner body part 24, grooves 34 of outer body part 26 and through the bores 47, the annular recess 48, and the bore 50 of the valve body. However, it will be observed that when the lifter mechanism 10 adjusts itself from the position shown in Figure 2 to the positions shown in Figures 3 and 4, limited pressure of oil in the chamber 29 will act to retard relative movement between the inner and outer body parts in effecting engagement of the clutch by virtue of the wedging action of the set of graduated rollers 40 when the outer body member 26 is moved by the cam 11. Thus, the pressure of the oil in the chamber 29 supplements the roller lock-up action of the clutch means to control the establishment of zero clearance in the valve operating train. The oil pressure chamber 29 thus provides a dashpot effect upon cam actuation of the valve lifter mechanism to assist in locking the body members together. However it will be appreciated that when the outer body member is relaxed, the oil in the chamber 29, like the spring 45, will effect or accommodate whatever adjustment is required in the valve train whereby cooperative action with the clutch rollers 40 and spring 45 is effective during a valve opening cycle to maintain the inner and outer body parts 24, 26 in their adjusted relative positions while upon closure of the engine valve, the spring 45 is assisted in unlocking the rollers to accommodate relative movement between said body parts to again establish the same in substantially zero clearance relationship for the ensuing valve opening cycle.

In installing the valve lifter mechanism of the present invention in the valve drive train of an engine, it makes no difference whether the engine be hot or cold during installation since over-adjustment, which would normally occur if the engine were hot during installation, and under-adjustment, which would normally occur if the engine were cold during installation, are readily compensated for and eliminated by the automatic operation of the valve lifter mechanism of the present invention.

While I have shown and described what I consider to be a preferred embodiment of my invention, it will be understood that various modifications and rearrangements may be made therein without departing from the spirit and scope of my invention.

I claim as my invention:

1. A valve lifter mechanism comprising an outer body member having a bore therein, an inner body member mounted for sliding movement in and axially of said bore, and clutch means operably incorporated between said inner and outer body members comprising at least one substantially V-shaped groove means defined by a first groove extending axially outwardly of the bore of said outer body member and a second axially extending groove in said inner body member in register with said first groove, and a plurality of roller elements disposed in each of said groove means for movement lengthwise thereof, said roller elements being of graduated increasing diameters from the narrow to the wide portions of said groove means and being adapted to have peripheral frictional engagement with adjacent portions of the surfaces of said groove means, said roller elements being adapted upon movement of one of said body members in one direction to clutch said inner and outer body members together for conjoint movement, said V-shaped groove means narrowing in said one direction, whereby said roller elements are adapted to accommodate relative movement of said body members in either direction with respect to each other when said one body member is not moved in said one direction.

2. A valve lifter mechanism comprising an outer body member having a bore therein, an inner body member mounted for sliding movement in and axially of said bore, and clutch means operably incorporated between said inner and outer body members comprising substantially V-shaped groove means defined by a first groove extending axially outwardly of the bore of said outer body member, and a second groove in said inner body member in register with said first groove, a plurality of roller elements disposed in said groove means for movement lengthwise thereof, said roller elements being of graduated increasing diameters from the narrow to the wide portions of said groove means and being adapted to have peripheral frictional engagement with adjacent portions of the surfaces of said groove means, said roller elements being adapted upon movement of one of said body members in one direction to clutch said inner and outer body members together for conjoint movement, said V-shaped groove means narrowing in said one direction, and spring means normally biasing said roller elements toward the narrow end portion of said groove means, whereby said roller elements are adapted to accommodate relative movement of said body members in either direction with respect to each other when said one body member is not moved in said one direction.

3. A valve lifter mechanism comprising an outer body member having a bore therein, an inner body member mounted for sliding movement in and axially of said bore, and clutch means operably incorporated between said inner and outer body members comprising substantially V-shaped groove means defined by a first groove extending axially outward of the bore of said outer body member and a second groove in said inner body member in registry with said first groove, and a plurality of roller elements disposed in said groove means for movement lengthwise thereof, said roller elements being of graduated increasing diameters from the narrow to the wide portions of said groove means and being adapted to have peripheral frictional engagement with adjacent portions of the surfaces of said groove means, said roller elements being adapted upon movement of one of said body members in one direction to clutch said inner and outer body members together for conjoint movement, said V-shaped groove means narrowing in said one direction, the groove in said one body member having a bottom wall substantially parallel to the axis of said body members and the groove in the other body member having a bottom wall inclined with respect to the axis of said body members, whereby said roller elements are adapted to accommodate relative movement of said body members in either direction with respect to each other when said one body member is not moved in said one direction.

4. A valve lifter mechanism for use in a valve drive train for opening and closing the valve of an engine, the engine having a cam for actuating the valve drive train to open the engine valve, comprising an outer body member having a bore therein, an inner body member mounted for sliding movement in and axially of said bore, means in said bore for normally biasing said body members away from one another and for accommodating relative movement of said body members toward one another, said body members being confined between the engine cam and the engine valve and being adapted to maintain substantially zero clearance in the valve drive train, the engine cam engaging said outer body member and being adapted to move said outer body member in a direction to open the engine valve, said outer body member having a groove therein the bottom wall of which is substantially parallel to the direction of movement of the outer body member, said inner body member having a groove therein in registry with the groove in said outer body member, the groove in said inner body member having a bottom wall inclined with respect to the direction of movement of said outer body member to define a generally V-shaped groove means between said body members, the apex of said V-shaped groove means being disposed in the direction of the engine valve so that said V-shaped groove means narrows in the direction of movement of said outer body member when opening the engine valve, and a plurality of roller elements disposed in said groove means for movement lengthwise thereof, said roller elements being of graduated increasing diameters from the narrow to the wide portions of said groove means and being adapted to have peripheral frictional engagement with the bottom walls of said grooves, said roller elements upon actuation of said outer body member by the engine cam being adapted to roll up the ramp defined by the inclined bottom wall of said groove in said inner body member to lock said body members together for conjoint movement in opening the engine valve, said roller elements being adapted when said outer body member is not actuated by the engine cam to slide with respect to the bottom wall of said groove in said outer body member to accommodate relative movement of said body members in either direction to maintain substantially zero clearance in the valve drive train in the closed position of the engine valve.

5. A valve lifter mechanism comprising an outer body member having a bore therein, an inner body member mounted for sliding movement in and axially of said bore, a spring confined between said body members normally biasing said body members away from one another and accommodating relative movement of said body members toward one another, and clutch means operably incorporated between said inner and outer body members comprising at least one substantially V-shaped groove means defined by a first groove extending axially outwardly of the bore of said outer body member and a second axially extending groove in said inner body member in register with said first groove, and a plurality of roller elements disposed in each of said groove means for movement lengthwise thereof, said roller elements being of graduated increasing diameters from the narrow to the wide portions of said groove means and being adapted to have peripheral frictional engagement with adjacent portions of the surfaces of said groove means, said roller elements being adapted upon movement of one of said body members in one direction to clutch said inner and outer body members together for conjoint movement, said V-shaped groove means narrowing in said one direction, whereby said roller elements are adapted to accommodate relative movement of said body members in either direction with respect to each other when said one body member is not moved in said one direction.

6. A valve lifter mechanism for use in a valve drive train for opening and closing a valve of an engine, the valve drive train having fluid passageway means therein for connection with a source of fluid under pressure, comprising an outer body member having a bore therein, an inner body member mounted for sliding movement in and axially of said bore, said body members defining a chamber therebetween and having fluid passageway means therein connecting said chamber with the fluid passageway means of the valve drive train, the fluid in said chamber normally biasing said body members away from each other and accommodating relative movement of said body members toward each other to maintain substantially zero clearance in the valve drive train, and clutch means operably incorporated between said inner and outer body members comprising at least one substantially V-shaped groove means defined by a first groove extending axially outwardly of the bore of said outer body member and a second axially extending groove in said inner body member in register with said first groove, and a plurality of roller elements disposed in each of said groove means for movement lengthwise thereof, said roller elements being of graduated increasing diameters from the narrow to the wide portions of said groove means and being adapted to have peripheral frictional engagement with adjacent portions of the surfaces of said groove means, said roller elements being adapted upon movement of one of said body members in one direction to clutch said inner and outer body members together for conjoint movement, said V-shaped groove means narrowing in said one direction, whereby said roller elements and the fluid in said chamber are adapted to accommodate relative movement of said body members in either direction with respect to each other when said one body member is not moved in said one direction.

7. A valve lifter mechanism for use in a valve drive train for opening and closing the valve of an engine, the engine having a cam for actuating the valve drive train to open the engine valve, the valve drive train having fluid passageway means therein for connection with a source of fluid under pressure, comprising an outer body member having a bore therein, an inner body member mounted for sliding movement in and axially of said bore, a spring confined between said body members normally biasing said body members away from one another and accommodating relative movement of said body members toward one another, said body members defining a chamber therebetween and having fluid passageway means therein connecting said chamber with the fluid passageway means of the valve drive train, the fluid in said chamber normally biasing said body members away from each other and accommodating relative movement of said body members toward each other, said body members being confined between the engine cam and the engine valve and being adapted to maintain substantially zero clearance in the valve drive train, the engine cam engaging said outer body member and being adapted to move said outer body member in a direction to open the engine valve, said outer body member having a groove therein the bottom wall of which is substantially parallel to the direction of movement of the outer body member, said inner body member having a groove therein in registry with the groove in said outer body member, the groove in said inner body member having a bottom wall inclined with respect to the direction of movement of said outer body member to define a generally V-shaped groove means between said body members, the apex of said V-shaped groove means being disposed in the direction of the engine valve so that said V-shaped groove means narrows in the direction of movement of said outer body member when opening the engine valve, and a plurality of roller elements disposed in said groove means for movement lengthwise thereof, said roller elements being of graduated increasing diameters from the narrow to the wide portions of said groove means and being adapted to have peripheral frictional engagement with the bottom walls of said grooves, said roller elements upon actuation of said outer body member by the engine cam being adapted to roll up the ramp defined by the inclined bottom wall of said groove in said inner body member to lock said body members together for conjoint movement in opening the engine valve, said roller elements being adapted when said outer body member is not actuated by the engine cam to slide with respect to the bottom wall of said groove in said outer body member to accommodate relative movement of said body members in either direction to maintain substantially zero clearance in the valve drive train in the closed position of the engine valve.

GLENN T. RANDOL.

References Cited in the file of this patent

UNITED STATES PATENTS

| Number | Name | Date |
|---|---|---|
| Re. 21,802 | Russell | May 13, 1941 |
| 1,457,819 | Caulfield | June 5, 1923 |
| 1,624,497 | McAllister | Apr. 12, 1927 |
| 1,663,345 | Lievre | Mar. 20, 1928 |
| 1,806,229 | Williams | May 19, 1931 |
| 2,061,167 | Nardone | Nov. 17, 1936 |
| 2,326,780 | Howard | Aug. 17, 1943 |